Figure 1:
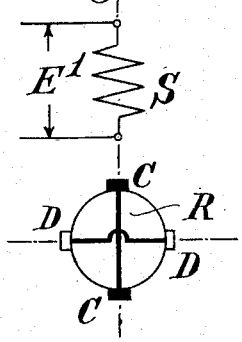

V. A. FYNN.
SINGLE PHASE ALTERNATE CURRENT MOTOR AND GENERATOR.
APPLICATION FILED DEC. 19, 1906.

956,845.

Patented May 3, 1910.

3 SHEETS—SHEET 1.

WITNESSES:
Fred White
René Ruine

INVENTOR:
Valere Alfred Fynn,
By Attorneys,
Arthur C. Fraser Verner

V. A. FYNN.
SINGLE PHASE ALTERNATE CURRENT MOTOR AND GENERATOR.
APPLICATION FILED DEC. 19, 1906.
956,845.
Patented May 3, 1910.
3 SHEETS—SHEET 2.
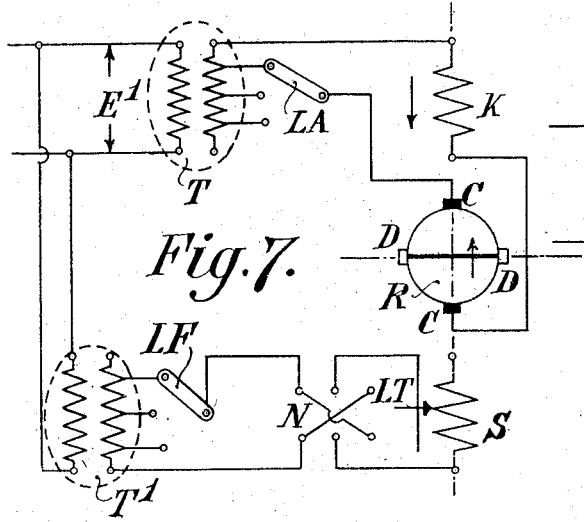
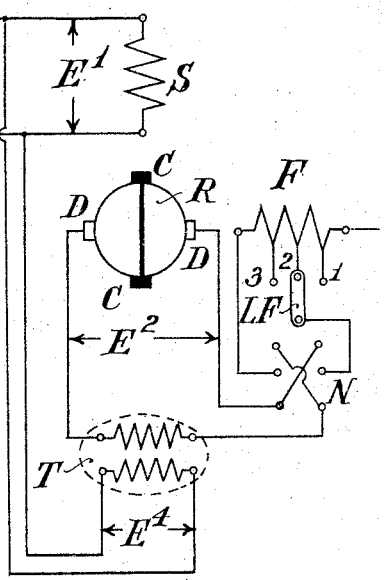
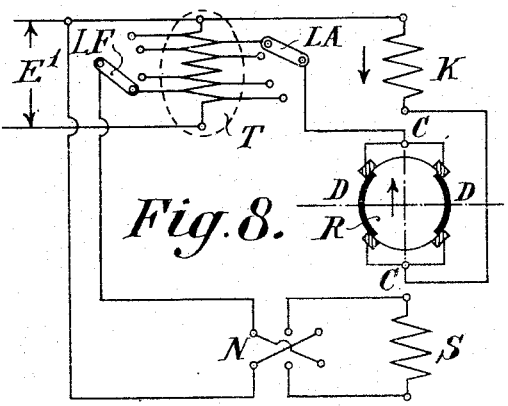
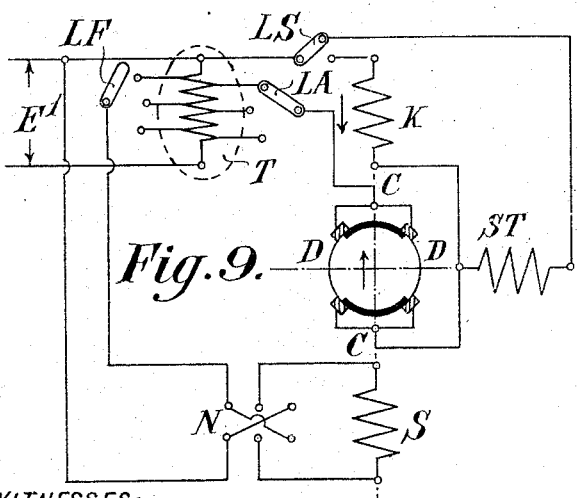
INVENTOR:
Valère Alfred Fynn,
By Attorneys,
WITNESSES:

UNITED STATES PATENT OFFICE.

VALÈRE ALFRED FYNN, OF LONDON, ENGLAND.

SINGLE-PHASE ALTERNATE-CURRENT MOTOR AND GENERATOR.

956,845. Specification of Letters Patent. Patented May 3, 1910.

Application filed December 19, 1906. Serial No. 348,659.

*To all whom it may concern:*

Be it known that I, VALÈRE ALFRED FYNN, of 18 Blessington road, Blackheath, London, England, electrical engineer, have invented certain new and useful Improvements in or Relating to Single-Phase Alternate-Current Motors and Generators, of which the following is a specification.

This invention is particularly applicable to single-phase commutator motors having a shunt characteristic, armature (or working) and exciting brushes in which the self induction of the armature is as far as possible neutralized and in which the exciting E. M. F. is generated in the rotor itself and by rotation of the latter in an alternating field. In other words this invention is applicable to self-excited shunt commutator motors in which the armature reaction is neutralized as far as possible. Motors having the above characteristics can be of the conduction or induction type. In induction motors the energy is conveyed to the rotor along the armature axis by induction, such motors are neutralized *ipso facto*. In conduction motors the energy is conveyed to the rotor along the armature axis by conduction, such motors must carry on the stator and in the armature axis a neutralizing winding adapted to counteract the armature reaction and conductively or inductively related to the armature winding.

This invention is also applicable to generators inasmuch as all motors can be used as generators, for instance when they are called upon to act as brakes.

It is the object of this invention to make it possible to operate such motors from a single-phase supply and at any desired constant speed quite independently of the periodicity of the supply and of the number of poles of the motor and also to easily start them and improve their power factor. The desired constant speed is obtained by varying the magnitude of the working E. M. F. and that of the motor field independently from each other. The motors are started and their power factor is improved by known means used in combination with the novel means disclosed herein and which serve the purpose of operating the said machines at any desired and nearly constant speed.

It has hitherto been generally assumed that the only possible speed of a so-called single-phase induction motor must necessarily be sensibly equal to the synchronous speed of the machine as determined by the periodicity of the circuit and the number of poles of the motor. I have however discovered that this need not be the case, and I propose in order that my invention and its scope may be better understood to shortly define the theory out of which the invention was evolved and while I believe my views to be broadly correct I do not wish to be bound to this or any other theory.

The accompanying drawings show diagrammatically and by way of example several forms of motor embodying my invention. In order to simplify these drawings and the description as far as possible it has been assumed that the motors or armatures when nothing to the contrary is said, are provided with Gramme ring windings while the brushes rest directly on these windings. In practice any suitable form of winding such as can be used in continuous current machines may be employed and this would be connected to a commutator upon which the brushes will rest. Any form of stator winding may be employed and although all the examples refer to two pole motors the invention is applicable to motors with any number of poles. I prefer to make the stationary part of the motor of the stator type, but a form having well defined polar projections may be used.

Figure 2:
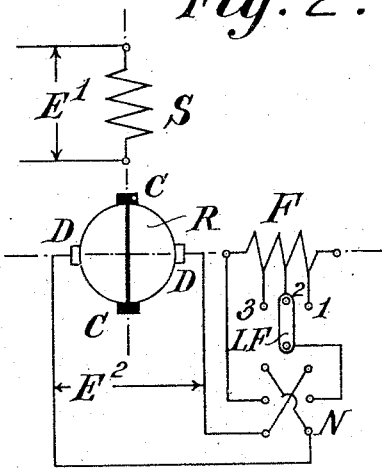
Figure 3:
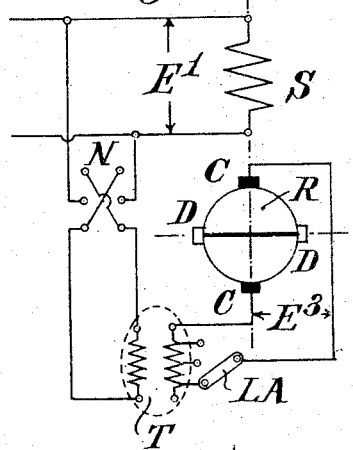
Figure 5:
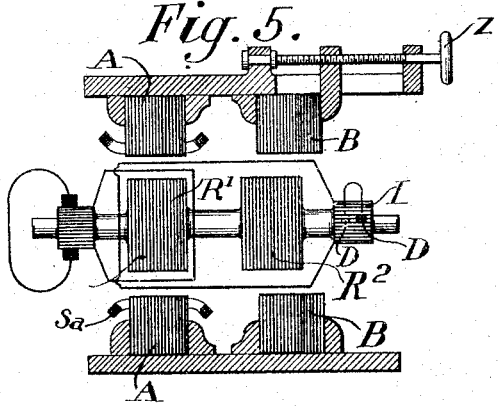
Figure 4:
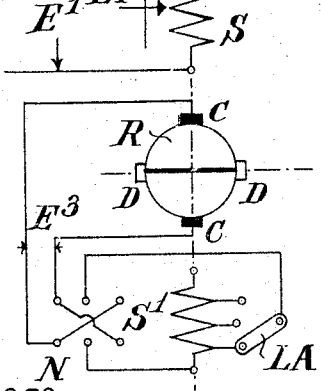
Figure 6:
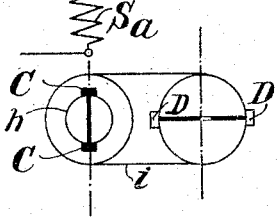

Figure 1 of the drawings shows a known form of self-excited single-phase shunt induction motor; Fig. 2 shows a self-excited, single phase, shunt motor with neutralized armature reaction in which the motor field can be regulated according to this invention; Fig. 3 shows a motor of the type shown in Fig 2 and in which the working E. M. F. can be regulated according to this invention; Fig. 4 shows a modification of Fig. 3; Figs. 5 and 6 show one way of inserting impedance into the field circuit of a motor of the type shown in Fig. 2 for the purpose of varying its speed; Fig. 7 shows a motor of same type as that shown in Fig. 2, the working E. M. F. being conveyed to the armature by conduction. Working E. M. F. and motor field can be varied independently. Fig. 8 shows a modification of Fig. 7; Fig.

Figure 11:
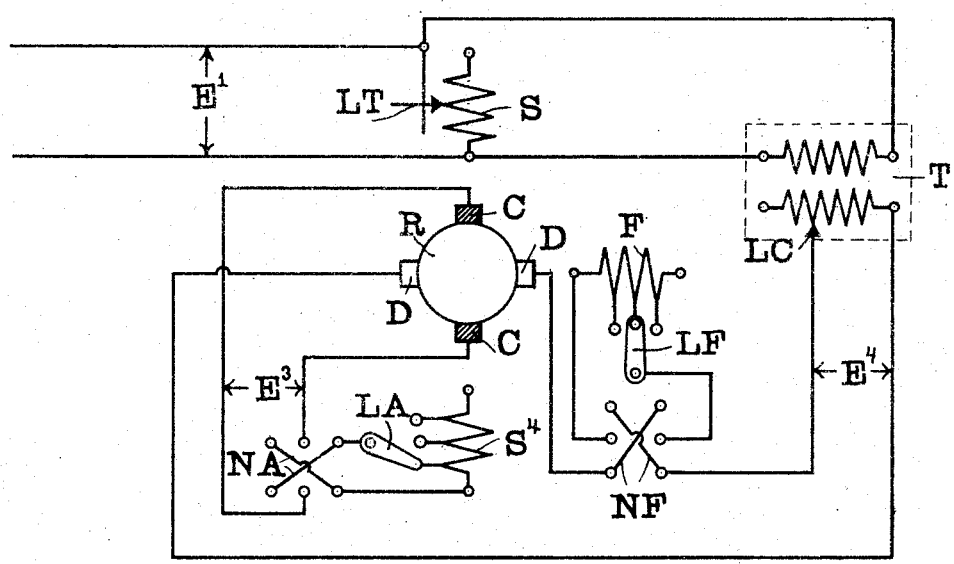

9 shows means for starting the motor shown in Fig. 8; Fig. 10 shows means for compensating the motor shown in Fig. 2; Fig. 11 shows a motor in which the speed may be varied by varying both the motor field and the working E. M. F.

Referring to the known fundamental form of the single phase induction motor illustrated in Fig. 1, I believe that the operation of the machine is as follows: The stator-winding S produces in its axis an alternating field, and the rotor R, being short-circuited by the brushes C C along that same axis, acts as the secondary of a transformer whose primary is represented by S. An E. M. F. (lagging by 90 degrees behind the transformer field) is consequently induced in the rotor along the axis C C, which I will hereinafter refer to as the transformer axis, and this E. M. F. tends to set up a heavy current in the rotor. Because of the rotation of the rotor conductors in the transformer field an E. M. F. is generated along the axis D D. This E. M. F. must be in phase with the transformer field and according to the direction of rotation it will be either of the same or the opposite sign to it. This E. M. F. acting on the closed circuit in the axis D D gives rise to a current the magnetizing component of which lags by 90 degrees behind this E. M. F. and produces a field sensibly co-phasal with itself and consequently displaced with regard to the transformer field by approximately 90 degrees both in phase and in space. Conversely because of the rotation of the rotor conductors in the field along D D an E. M. F. is generated in the rotor along the axis C C in phase with the field producing it and therefore displaced by approximately 90 degrees with regard to the transformer field and consequently in phase or nearly so with the E. M. F. statically induced in that axis but of opposite direction to it. When these two E. M. F.'s balance each other as to phase and magnitude there will be no current flowing in the rotor axis C C; if for instance the E. M. F. due to rotation is smaller than that due to transformation or static induction or not of exactly opposite phase to the latter then a current will flow and it will lag behind the resultant E. M. F. much as the secondary current in a transformer not devoid of leakage lags behind the secondary E. M. F. when short-circuited or working on a circuit possessed of some self-induction. Now the torque which the motor is able to exert is due to the interaction of the rotor current in the transformer axis and the field in the axis D D, to which I will hereafter refer as the motor field. These two are very nearly in phase though of opposite sign and in the most advantageous relative position in space for the production of a torque. I wish particularly to emphasize that this is really a reproduction of those very same conditions which obtain in a continuous current motor and determine its operation. The transformer field is not of course to be found in a continuous current machine. In the alternate current machine it does no directly useful work and is simply a means for conveying the working E. M. F. and current into the armature by induction, instead of by conduction as in the continuous current case and the transformer axis can for this reason be referred to as the armature axis. It further produces indirectly and as has already been explained, the E. M. F. necessary for the field excitation. The field of this motor is produced by a winding whose axis is perpendicular to the armature brush line, as in a continuous current motor, but in the alternate current motor the armature winding itself is made use of for this purpose instead of the field coils usual in continuous current machines. Instead of impressing on the armature winding which here acts as the field winding, an E. M. F. derived from the supply the E. M. F. $E^2$ impressed on that circuit is here generated by rotation in the transformer field. It is for this reason that these motors are referred to as being "self-excited". The working E. M. F. in the axis C C which I will call E T and which is here due to static induction, corresponds to the E. M. F. impressed on the armature of a continuous current motor. The back E. M. F. in the axis C C which I will call E B and which is here due to rotation in the motor field corresponds to the back E. M. F. of a continuous current armature generated in the same manner. I take advantage of these conditions to control the speed of such motors by suitably modifying the lines followed in the case of their continuous current prototypes so as to take into account the differences which I have just pointed out and which are brought about by the fact that an alternating instead of a continuous current is being used. The reason why the induction motor as shown in Fig. 1 actually does run at a constant and nearly synchronous speed can now be recognized. Since this motor is quite similar to a continuous current machine its speed will be limited by the same factors. A continuous current motor will reach its normal speed when the back E. M. F. (E B) of the armature practically equals the working E. M. F. (E T) impressed on it. In order to recognize when these conditions are reached in the induction motor we must bear in mind that an E. M. F. due to static induction and generated in a stationary or revolving conductor is of the same period as the inducing field and only dependent on the latter for its magnitude and that an E. M. F. of rotation depends for its magnitude on the field in which it revolves and on the speed of revolution while its periodicity is always the same as that of the field in question. It is then to be noted firstly that all the E. M. F.'s. which have to be taken into account in the induction motor are of the same period, secondly that the motor field will be equal in magnitude to the transformer field when the E. M. F. along D D is equal to that E. M. F. along C C which is due to static induction (provided of course that the construction of the motor is symmetrical in all directions as is actually the case in the modern induction motor); seeing that the iron cross section and the number of rotor turns is the same along the two axes and that the latter are placed in precisely the same inductive relation to both fields, and also disregarding all losses for the moment, this must be the case when the speed of revolution is equal to the synchronous speed that is to say when the speed expressed in cycles equals the cycles or periodicity of the supply, and that being so the third and last conclusion is that the back E. M. F. in the transformer axis (due to a field of the same magnitude as the transformer field) will equal the impressed E. M. F. at this same or synchronous speed. The synchronous will therefore be the limiting speed of the machine.

In Fig. 2 is shown a self-excited single-phase shunt induction motor the speed of which is regulated by varying or regulating the magnitude of the motor field independently of the working E. M. F. The line pressure $E^1$ is impressed on the stator winding S, a transformer field is produced and the latter induces the working E. M. F. at the short-circuited brush C C on the rotor. The exciting E. M. F. $E^2$ is generated at the brushes D D by rotation in the transformer field. The means for varying the speed consist in a winding F disposed on the stator and in the motor field axis, the number of turns of said winding can be varied by means of the switch L F, whereby the magnitude of the magnetization due to F is varied. The direction of this magnetization can be reversed, with respect to that produced by the rotor winding along the motor field axis, by means of the reversing switch N. Although the relative positions of the various elements as shown in Fig. 2 will generally be the most suitable yet they are not the only possible. Thus F need not be displaced by exactly 180/n degrees with respect to S; it must however not coincide with S; the effectiveness of F as far as speed regulation is concerned will diminish as its axis approaches that of S. It is also not necessary that the brushes C C and D D be displaced by exactly 180/n degrees nor that the brushes C C shall stand exactly along the axis of S. Any other known disposition of the brushes may be made use of. The exciting and armature windings can be wound on the rotor independently from each other. These remarks apply to all the examples dealt with. This motor is particularly claimed in a divisional application, Serial No. 481,765, filed March 6, 1909.

In Fig. 3 is shown a motor of the type described in connection with Fig. 2, but in this case the speed is regulated or altered by regulating the working E. M. F. independently of the motor field. This working E. M. F. could be varied by varying the transformer field, but this would cause the exciting E. M. F. to vary in the same proportion with the result that the speed would remain practically constant and nearly equal to the synchronous. Instead then of varying the magnitude of the transformer field I introduce into the armature circuit by conduction an E. M. F. of same phase as that impressed on the armature circuit by induction, choosing the direction of the conductively impressed E. M. F. equal or opposed to the direction of E. M. F. impressed by induction. If the directions of the two E. M. F.'s. are the same, then the speed will rise for the true working E. M. F. will be the resultant of the two impressed E. M. F's. and will be greater than the E. M. F. impressed inductively. If the directions of the two impressed E. M. F's. are opposed, the speed will fall. This conductively impressed E. M. F. $E^3$ can be introduced into the armature circuit by means of the transformer T capable of being regulated at L A and connected on one side to the armature brushes C C and on the other in parallel to the mains. The direction of $E^3$ can be reversed with the help of switch N. Instead of deriving $E^3$ from the mains with the help of an independent transformer, it can be derived therefrom by means of a winding disposed on the stator and preferably in the same axis as S. Generally speaking $E^3$ may be derived from any convenient source yielding an E. M. F. materially in phase with $E^1$.

Fig. 4 shows an induction motor in which the exciting E. M. F. and consequently the motor field is varied by varying the magnitude of the transformer field, in order to be able to simultaneously keep the working E. M. F. constant or vary it independently of and not proportionally with $E^2$, an E. M. F. $E^3$ is introduced into the armature circuit. The means for introducing $E^3$ into the armature circuit are similar to those described in reference to Fig. 3. In this case $E^3$ is derived by way of example from the stator winding $S^1$ placed coaxially with S. The transformer field is varied by varying the number of effective turns in the winding S with the help of switch L T. Instead of varying the transformer field in the manner described it can be varied by varying $E^1$, for instance with the help of a variable ratio transformer.

In Figs. 5 and 6 is shown an induction motor in which the motor field is varied independently of the working E. M. F. by inserting into the exciting circuit an impedance so placed that it will be outside the influence of the armature winding. By varying this impedance the magnitude of the motor field will be varied. In all cases the magnitude of the impedance will not only effect the magnitude of the exciting current, but also the magnitude of that part of the total field corresponding to the exciting E. M. F. which will be produced outside the influence of the armature winding so that the useful part of the motor field will be reduced and the speed raised.

In Figs. 5 and 6 two stators A and B are placed side by side inclosing the double rotor $R^1$ $R^2$. One of the stators, say A, carries the winding $S_a$. The rotors carry two windings here shown as being of the drum type, the one (the armature winding $h$), embracing rotor $R^1$ only, is short-circuited at the commutator H coaxially with $S_a$ and by means of the brushes C C. The other rotor winding (the field winding $i$) is short-circuited at the commutator I at right angles to the axis of $S_a$ and by way of the brushes D D. The field due to the exciting E. M. F. threads both rotors and stators because the winding $i$ embraces them both. At about synchronous speed the total number of lines in the transformer field, threading A and $R^1$ will be equal to the total number of lines in the motor field threading A $R^2$ and in the inactive field threading B $R^2$. Since the working winding responsible for the back E. M. F. at the C C brushes only embraces one rotor and consequently only part of the field due to the exciting E. M. F. then the smaller the field embraced by the working winding the greater will be the motor speed in order to produce a back E. M. F. of the required magnitude. The speed can be varied for instance by varying in some well known way the magnetic reluctance of the path for the inactive part of the field due to the exciting E. M. F. and afforded by the stator B thus increasing or decreasing the active part of said field (motor field) which links with the armature winding connected to the commutator H and is responsible for the back E. M. F. This reluctance can be varied for instance by axially displacing the stator B in any convenient way as by means of the screw Z for example, thus causing it to embrace a smaller portion of the rotor $R^2$. This motor is particularly claimed in a divisional application Serial No. 481,761, filed March 6, 1909.

Fig. 7 shows a self-excited single-phase shunt conduction motor in which the working E. M. F. is impressed on the rotor along the armature axis by conduction and in which the armature ampere turns are neutralized by means of the stator winding K. In order to make self excitation possible a transformer field is provided being produced by the winding S, short-circuited exciting brushes D D are also provided. The transformer winding S is preferably disposed on the stator and in the armature axis. The exciting E. M. F. $E^2$ is generated at the brushes D D by rotation of the rotor windings in the said transformer field, the phase and magnitude of the motor field depend directly on $E^2$. In this example the motor field can be independently regulated by means of the variable ratio transformer $T^1$ connected in parallel to the mains. The motor field can be reversed by reversing switch N, its magnitude can also be varied by varying the number of effective turns of S as at L T. The greater the transformer field, the greater the motor field and the lower the speed for a given working E. M. F. and vice versa. In this example, means are also shown at L A for regulating the transformer T connected in parallel to the mains and supplying the working E. M. F. which can thus be regulated independently of the motor field. The greater this E. M. F. for a given transformer field, the higher the speed and vice versa. Here also the armature and exciting windings can be made independent from each other. The motor field may be regulated for instance as shown in Fig. 2. The brushes D D need not necessarily be displaced by exactly $180/n$ degrees with respect to the brushes C C. If S is not made co-axial with the brushes C C then the motor can be made self-starting. This type of motor has been claimed in a divisional application, Serial No. 481,766, filed March 6, 1909.

Fig. 8 shows a modified form of the same motor. The brushes are disposed along axes displaced by about 45° with respect to the axis of the neutralizing winding K and are short-circuited in pairs, the armature current being made to flow from one short-circuited pair of brushes to the other by way of those rotor conductors which are disposed on the portions of the rotor periphery which are distinguished by thick lines in Fig. 8. This portion of the rotor winding does duty as armature winding, the rest as field winding. In this instance a single transformer T is made use of for independently regulating the working E. M. F. and the motor field.

In Fig. 9 are shown means for starting such a motor as a separately excited series induction motor. For this purpose a starting winding S T is disposed on the stator being preferably displaced by $180/n$ degrees with respect to the armature axis and connected to switch L S. For starting K is cut out of circuit by means of L S and S T is connected in series with that portion of the rotor which is not short-circuited. S T now induces the armature current in that portion of the rotor winding which in Fig. 9 is distinguished by thick lines, whereas the rest of the rotor winding does duty as field winding. When the motor has reached a sufficiently high speed L S is moved so as to cut S T out and cut K in, the motor now continuing to run as a self-excited shunt conduction motor, provided S is also connected to the mains. The motor will start in the manner described whether S is connected to the mains at starting or not. This motor can also be started by connecting it up for the time being in some other known way and connecting it into a self-excited shunt conduction machine after a sufficiently high speed has been reached. The motor field can also be regulated by introducing into the exciting circuit an E. M. F. displaced in phase by about 90° with respect to the working E. M. F. and derived from any outside source. Although good results are thus obtained, this arrangement is nevertheless of smaller general utility because of the necessity of such an independent source. The power factor of such motors can be improved in a manner now well understood and which consists in introducing into the exciting circuit an auxiliary E. M. F. $E^4$ the phase of which preferably approximately coincides with the phase of the working E. M. F. Fig. 10 shows such an arrangement in a general way and as applied to the motor shown in Fig. 2, the compensating E. M. F. $E^4$ being introduced into the exciting circuit with the help of the transformer T. $E^4$ can be derived from the mains through T or from the motor itself in a manner now well understood. Suitable regulating means may be employed in all cases. The power factor of such motors can also be improved in a manner now well understood and which consists in introducing into the armature circuit an auxiliary E. M. F. $E^5$ the phase of which preferably approximately coincides with the phase of the exciting E. M. F.

A number of means for regulating self-excited neutralized single-phase shunt motors have not been described. Any or all of these may be combined in any desired manner in one and the only question is which considerations should guide one in the selection of the most suitable means for a given case.

Referring to Fig. 11, the main inducing stator winding S is supplied from the mains. The line pressure is indicated by E' and provision is made at L T for one way of varying the volts per turn in S. This variation makes it possible to vary the magnitude of the transformer field due to S thus influencing the commutation of the machine; the speed of the machine cannot, however, be varied by only varying the volts per turn in S and without conductively impressing a working or an exciting E. M. F. on the rotor for if said E. M. F's. are not introduced into the rotor, then the induced working E. M. F. and the generated exciting E. M. F. and consequently also the motor field and the back E. M. F. all vary proportionately. The induced member R is provided with a commuted winding and two sets of brushes C C and D D per pole pair or any known equivalent brush arrangement. The working brushes C C or those which carry the working current, are connected to a speed regulating winding $S^4$. The E. M. F. $E^3$ derived from $S^4$ is of approximately the same phase as the line E. M. F. E'. It can be regulated at L A and its direction can be reversed at N A. This regulating E. M. F. is therefore approximately of same phase as the working E. M. F. E T induced in R by S. When $E^3$ is of same direction as E T then the speed is raised. When it is of opposite direction the speed is lowered, the extent of the rise or fall in speed depending on the magnitude of $E^3$. The field circuit of the motor is closed by way of the brushes D D, the secondary of the transformer T and the stator field winding F. Transformer T supplies an E. M. F. $E^4$ practically in phase with E'. This $E^4$ is conductively introduced into the exciting circuit of the motor for the purpose of improving the power factor of the machine. It has already been explained that the machines to which this invention is applicable are self-exciting and that the exciting E. M. F. generated at the brushes D D is proportional to the speed. At low speeds this E. M. F. therefore becomes small and it is then of particular advantage to make use in addition of an auxiliary exciting E. M. F. which may be derived from a phase converter. A motor whose speed is varied in this way has been made the subject of a divisional application, Serial No. 481,762, filed March 6, 1909. The field winding disposed on the stator at F is for the purpose of varying the strength of the motor field for a given total exciting E. M. F. and can also be used with advantage for preventing the exciting current reaching an undesirably high value when the exciting E. M. F. is varied. The effective number of turns in F can be varied at L F. The direction of the magnetization due to F can be reversed at N F.

The speed of the machine shown in Fig. 11 can be varied by adjusting the windings F or $S^4$ while varying the volts per turn in S or not. Its power factor can be adjusted at any speed by adjusting $E^4$.

I have already indicated that magnetic densities should always be borne in mind and avoided where possible, which is easily achieved. But an equally important consideration is that of sparking. When a shunt induction motor runs at a synchronous or nearly synchronous speed then there is practically only the so-called reactance voltage $E^8$ to be considered in the coil undergoing commutation, for the E. M. F. ($E^6$) induced therein by the transformer action due to the motor field is practically equaled and opposed by that E. M. F. ($E^7$) which is generated in that coil by its rotation in the transformer field. Now $E^6$ is independent of the speed and only depends on the magnitude of the motor field and on the periodicity N of the supply, whereas $E^7$ is proportional to the magnitude of the transformer field and to the speed of revolution, and, since the latter can always be expressed in cycles, $E^7$ can be said to be proportional to the magnitude of the transformer field and to N′ the periodicity of the speed. At or near synchronism the transformer and motor fields are practically equal and N nearly equals N′. In order to get good commutation at speeds differing from the synchronous it is necessary to so vary the magnitude of the two fields that $E^6$ and $E^7$ cancel out as nearly as possible at the speed chosen. For instance if the speed at which the motor is to run is below the synchronous and the transformer field is to be kept constant for some reason or other, then the motor field should be decreased until $E^6$ equals $E^7$, the speed reduction being obtained for instance by choosing $E^3$ sufficiently great and opposed to E T. If on the other hand the speed at which the motor is to run is above the synchronous and the transformer field is again to be kept constant then the motor field should be increased until $E^6$ equals $E^7$ while the increase in speed is obtained by choosing E sufficiently great and of the same direction as E T. These examples have not been chosen because they represent ideal conditions but on account of their simplicity and in order to clearly illustrate the lines to be followed. To those skilled in the art they will supply sufficient guidance.

It should be remembered that throughout this specification the E. M F's. ($E^1$, $E^2$, $E^3$) are made use of for regulating the speed of, whereas the E. M. F's. ($E^4$, $E^5$) are made use of for compensating the motors.

It is to be understood that although the potentials applied to the windings along the armature and along the field axes of the motors herein described may be varied in magnitude yet the phase relation of these potentials is to remain very nearly constant for all speeds. All these motors can also operate as generators and will act as brakes when used for traction purposes or return energy to the supply, the means for regulating their speed also affording means for varying the speed at which they will begin to return energy.

What I claim and desire to secure by Letters Patent is:—

1. In an alternating current motor, the combination with an induced member, of an inducing member provided with a main inducing winding, means for conductively introducing into the induced member along an axis coinciding with the main inducing winding, an E. M. F. of approximately the same phase as that impressed on the main inducing winding, and exciting brushes for permitting an exciting current to flow through the induced member along an axis displaced from that of the main inducing winding, said exciting current being generated in the said induced member by the rotation thereof and said induced member being so constructed that all of the exciting currents generated therein will close through brushes.

2. In an alternating current motor, the combination with an induced member, of an inducing member provided with a main inducing winding, means for varying the volts per turn in said winding, means for conductively introducing into the induced member along an axis coinciding with the main inducing winding an E. M. F. of approximately the same phase as that impressed on the main inducing winding, and exciting brushes for permitting an exciting current to flow through the induced member along an axis displaced from that of the main inducing winding, said exciting current being derived from the induced member, and said induced member being so constructed that all of the exciting currents generated therein will close through brushes.

3. In an alternating current motor, the combination with an induced member, of an inducing member provided with a main inducing winding, means for conductively introducing into the induced member along an axis coinciding with the main inducing winding, an E. M. F. of approximately the same phase as that impressed on the main inducing winding, means for permitting an exciting current to flow through the induced member along an axis displaced from that of the main inducing winding, said exciting current being derived from the said induced member, and means for impressing a compensating E. M. F. on the exciting circuit.

4. In an alternating current motor, the combination with a stationary member provided with a main inducing winding, of an induced member closed by way of brushes along an axis displaced from that of the main inducing winding, and an auxiliary winding on the stator in inductive relation to the main inducing winding and connected in series with the induced member along an axis coinciding with that of the main inducing winding.

5. In an alternating current motor, the combination with a stationary member provided with a main inducing winding and a field winding displaced from said main inducing winding, of an induced member, said induced member being connected in series relation with the field winding along an axis displaced from that of the main inducing winding, and means for conductively impressing on said induced member along an axis coinciding with the axis of the main inducing winding an E. M. F. of substantially the same phase as that impressed on the said inducing winding.

6. In an alternating current motor, the combination with a stationary member provided with a main inducing winding and a field winding displaced from said main inducing winding, of an induced member, said induced member being connected in series relation with the field winding along an axis displaced from that of the main inducing winding, means for conductively impressing on said induced member along an axis coinciding with the axis of the main inducing winding an E. M. F. of substantially the same phase as that impressed on the said inducing winding and means for varying the volts per turn in the main inducing winding.

7. In an alternating current motor, the combination with a stationary member provided with a main inducing winding and a field winding displaced from said main inducing winding, of an induced member, said induced member being connected in series relation with the field winding along an axis displaced from that of the main inducing winding, connections for varying the magnitude and direction of the magnetic flux produced by said field winding, and means for conductively impressing on said induced member along an axis coinciding with the axis of the main inducing winding an E. M. F. of substantially the same phase as that impressed on the said inducing winding.

8. In an alternating current motor, the combination with a stationary member provided with a main inducing winding and a field winding displaced from said main inducing winding, of an induced member, said induced member being connected in series relation with the field winding along an axis displaced from that of the main inducing winding, connections for varying the magnitude and direction of the magnetic flux produced by said field winding, means for conductively impressing on said induced member along an axis coinciding with the axis of the main inducing winding an E. M. F. of substantially the same phase as that impressed on the said inducing winding, and means for varying the volts per turn in said main inducing winding.

9. In an alternating current motor, the combination with a stationary member provided with a main inducing winding and a field winding displaced from said main inducing winding, of an induced member, said induced member being connected in series relation with the field winding along an axis displaced from that of the main inducing winding, connections for varying the magnitude and direction of the magnetic flux produced by said field winding, means for conductively impressing on said induced member along an axis coinciding with the axis of the main inducing winding an E. M. F. of substantially the same phase as that impressed on the said inducing winding, means for varying the volts per turn in said main inducing winding and means for impressing a compensating E. M. F. upon the exciting circuit.

In witness whereof, I have hereunto signed my name in the presence of two subscribing witnesses.

VALÈRE ALFRED FYNN.

Witnesses:
GORDON MELVILLE CLARK,
ROBERT MILTON SPEARPOINT.